UNITED STATES PATENT OFFICE.

JOHN C. HOCHHAUS, OF ST. PAUL, MINNESOTA, ASSIGNOR TO EMILY HOCHHAUS, OF SAME PLACE.

WALL-CLEANING COMPOUND.

SPECIFICATION forming part of Letters Patent No. 524,327, dated August 14, 1894.

Application filed March 13, 1894. Serial No. 503,429. (No specimens.)

*To all whom it may concern:*

Be it known that I, JOHN C. HOCHHAUS, of St. Paul, Ramsey county, Minnesota, have invented certain Improvements in Wall-Cleaning Compounds, to be used for cleaning papered, tinted, calcimined, and frescoed walls, its object being to provide a composition that will not decompose or become unfit for use when handled as a commercial article, of which the following is a specification.

My composition consists of the following ingredients combined in these proportions, namely: exsiccated carbonate of soda, twenty-six ounces; carbonate of magnesia, one-half ounce; powdered charcoal, one ounce; powdered sulphur, one-half ounce; shorts, twenty pounds; ultra marine blue, two and one-half ounces, and cloves, one-half ounce.

For the preparation of the above described composition ordinary carbonate of soda must be prepared by either melting and evaporating by heat, exposure to the air or dry heat until all or nearly all of the water of crystallization is evaporated. The different substances are then mixed thoroughly together until finely divided.

The reason why exsiccated carbonate of soda must be used in the making of this compound, instead of ordinary carbonate of soda, is that the ordinary crystallized carbonate of soda contains 62.9 per cent. water and, if mixed with the other ingredients in the compound, the water in the crystallized carbonate would act on the other ingredients, first forming a sticky paste and, after a short time, dry out and form a hard, undivided mass. The exsiccated carbonate of soda contains no water, is perfectly dry, and can be mixed with all the other ingredients without injuring any of them, and will produce a fine, dry powder, which will never cake or spoil and which it would be impossible to produce by using the ordinary crystallized carbonate of soda.

The essentials in the above composition are the exsiccated carbonate of soda, carbonate of magnesia, charcoal, sulphur and shorts; the ultra marine blue and cloves are inserted merely for coloring and deoderizing purposes.

The carbonate of soda not exsiccated cannot be used to make this compound.

A compound composed only of exsiccated soda and shorts could be used for cleaning purposes, and would work to better advantage with the addition of one or more of the other elements of the complete composition, but for perfect work and keeping as a commercial article, the compound must contain each and all of the above elements or exact equivalents of any that might be omitted.

The charcoal and sulphur in the use of the composition help to cut and roll the dirt, smoke and other accumulation from the wall and also prevent the composition from caking, molding or decomposing and, also, prevents glazing on the surface when in use.

The soda and magnesia chemically act in the compound, raising it or forming air cells which fill with oxygen. The magnesia keeps the composition from being sticky and, as well, lightens it and prevents it from becoming caked.

This compound, prepared as above described, may be placed in packages and sold on the market and will not deteriorate as other articles of this class commonly do. It is sold commercially prepared as above described, but cannot be handled commercially after also being prepared for use.

In using the composition one pound is placed in a shallow vessel, one pint of cold water is added and they are then mixed thoroughly. This vessel is then placed in a hot water, sand or steam bath and maintained at the temperature of boiling water fifteen or twenty minutes, the contents being stirred from the bottom and mixed well every few minutes while boiling. It is then mixed and worked for a few minutes and allowed to cool in a covered vessel. When cold it is again worked and mixed well in the hands for about ten minutes, and is then ready for use. In rubbing the wall with it long even strokes, with slight pressure, causes all soot, dust and other accumulations to roll off, leaving the paper or wall clean and bright.

I claim—

1. A detergent powder, consisting of exsiccated carbonate of soda and shorts, substantially in the proportions and for the purposes specified.

2. A detergent powder, consisting of exsiccated carbonate of soda, shorts and carbonate of magnesia, substantially in the proportions and for the purposes specified.

3. A detergent powder, consisting of exsiccated carbonate of soda, shorts, carbonate of magnesia, and powdered charcoal, substantially in the proportions and for the purposes specified.

4. A detergent powder, consisting of exsiccated carbonate of soda, shorts, powdered sulphur and powdered charcoal, substantially in the proportions and for the purposes specified.

5. A detergent powder, consisting of exsiccated carbonate of soda, shorts, carbonate of magnesia, powdered sulphur, and powdered charcoal, substantially in the proportions and for the purposes specified.

In testimony whereof I affix my signature in presence of two witnesses.

JOHN C. HOCHHAUS.

Witnesses:
W. C. SWIFT,
H. S. JOHNSON.